United States Patent

Chen et al.

(10) Patent No.: US 9,800,756 B2
(45) Date of Patent: Oct. 24, 2017

(54) IMAGE FORMING DEVICE WITH LASER SCANNER UNIT AND MEMORY THEREFOR

(71) Applicant: LEXMARK INTERNATIONAL, INC., Lexington, KY (US)

(72) Inventors: Fei Chen, Lexington, KY (US); Christopher Dane Jones, Georgetown, KY (US); John Lemaster, Lexington, KY (US)

(*) Notice: Subject to any disclaimer, the term of this patent is extended or adjusted under 35 U.S.C. 154(b) by 0 days.

(21) Appl. No.: 15/446,386

(22) Filed: Mar. 1, 2017

(65) Prior Publication Data

US 2017/0192373 A1 Jul. 6, 2017

Related U.S. Application Data

(63) Continuation of application No. 14/983,987, filed on Dec. 30, 2015, now Pat. No. 9,699,352.

(51) Int. Cl.
| | |
|---|---|
| H04N 1/29 | (2006.01) |
| H04N 1/113 | (2006.01) |
| H04N 1/40 | (2006.01) |
| G06K 15/12 | (2006.01) |
| B41J 2/44 | (2006.01) |
| B41J 2/47 | (2006.01) |
| H04N 1/06 | (2006.01) |

(52) U.S. Cl.
CPC ............... *H04N 1/29* (2013.01); *B41J 2/442* (2013.01); *B41J 2/471* (2013.01); *G06K 15/1209* (2013.01); *H04N 1/113* (2013.01); *H04N 1/1135* (2013.01); *H04N 1/40037* (2013.01); *H04N 1/06* (2013.01); *H04N 2201/0094* (2013.01)

(58) Field of Classification Search
CPC .. H04N 1/29; H04N 1/40037; G06K 15/1209; B41J 2/442
See application file for complete search history.

(56) References Cited

U.S. PATENT DOCUMENTS

| | | | | |
|---|---|---|---|---|
| 5,146,240 A | * | 9/1992 | Hayashi | G06K 15/1214 347/246 |
| 5,739,841 A | * | 4/1998 | Ng | H04N 1/407 347/125 |
| 6,043,835 A | * | 3/2000 | AuYeung | B41J 2/471 347/237 |
| 6,175,375 B1 | * | 1/2001 | Able | G03G 15/50 347/132 |

(Continued)

*Primary Examiner* — Scott A Rogers

(57) ABSTRACT

An image forming device includes a controller and a laser scanning unit. The laser scanning unit includes a light source for generating a laser beam for discharging a photoconductive member to create an electrostatic latent image. A first memory is housed on the laser scanning unit and stores data unique to the laser scanning unit and laser beam as characterized during production. A second memory in communication with the controller, and separate from the first memory, stores data characterizing a family of similar laser scanning units of a same type. The controller is configured to read both the first and second memories to generate data to compensate for energy variations along a scan path of the laser beam on the photoconductive member during use. The data substantially reduces energy variation from one scan path to a next.

10 Claims, 7 Drawing Sheets

(56) References Cited

U.S. PATENT DOCUMENTS

| | | | | |
|---|---|---|---|---|
| 6,363,228 B1* | 3/2002 | Ream | ............... | G03G 15/1615 |
| | | | | 399/121 |
| 6,459,860 B1* | 10/2002 | Childers | ................. | B41J 2/04 |
| | | | | 399/12 |
| 7,206,012 B2* | 4/2007 | Cook | .................. | H04N 1/053 |
| | | | | 347/234 |
| 2011/0228355 A1* | 9/2011 | Morita | ............... | G03G 15/043 |
| | | | | 358/475 |
| 2015/0116438 A1* | 4/2015 | Kim | ................ | G03G 15/5033 |
| | | | | 347/133 |

* cited by examiner

IMAGE FORMING DEVICE WITH LASER SCANNER UNIT AND MEMORY THEREFOR

CROSS REFERENCES TO RELATED APPLICATIONS

This application claims priority and benefit as a continuation application of U.S. patent application Ser. No. 14/983,987, filed Dec. 30, 2015.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to electrophotographic imaging devices such as a printer or multifunction device having printing capability, and more particularly to a shading system for a laser scanning unit.

2. Description of the Related Art

In various imaging devices which utilize light to form images, optical scanning systems are typically incorporated to scan laser beams from one or more light sources onto a target image plane surface. In an electrophotographic imaging device, for example, the image plane surface is typically a photosensitive member. Generally, laser beams are swept across the image plane surface by a scanning mirror to form light spots upon the image plane surface along a scan line direction. Commonly used scanning mirrors include rotating polygon mirrors which scan laser beams in one direction.

A polygon mirror can have either an under-filled or over-filled facet design. In an under-filled design, the facet length is significantly wider than the incident laser beam width such that the beam footprint on a facet never crosses over the edges of the facet from start to end of a scan line operation. On the other hand, an over-filled design has a facet length that is narrower than the incident laser beam such that the beam footprint on a facet completely fills the facet and extends beyond its edges over the duration of a scan line operation. In this case, the width of the laser beam after it is reflected by the polygon mirror is determined by the size of the polygon facet.

Generally, in order to have a decent optical performance particularly on laser spot size, the width of a laser beam striking a polygon facet must be at least some requisite value. By comparison, for a given number of polygon facets, the under-filled design would require a larger polygon diameter since size of a facet would have to be wider than the requisite beam width, while the over-filled design would require a smaller polygon diameter since length of a facet only needs to be at least the same as the requisite beam width. In the under-filled design with relatively larger facets, the entire beam, in the form of a focused line segment, is projected onto a facet and reflected downstream to the photosensitive member as the polygon mirror rotates. The power profile of this line segment is typically Gaussian in nature and the resultant spot at the photosensitive member is composed of the entire Gaussian profile since the entire line segment is received and reflected by the facet. Thus, spot power variation across scan lines is generally consistent from unit to unit which allows for the same set of characterization data to be used for all units of the same type.

However, in the over-filled design with relatively smaller facets and smaller diameter polygon mirrors, the line segment overfills a facet. As the polygon mirror rotates, different sections of the Gaussian profile is reflected downstream and the focused spot at the photosensitive member has relatively higher variation in power, often referred to as power rolloff, as the focused spot moves across the scan line. Unit to unit variation typically exists because of accumulated tolerances brought about by difficulty of having precise optical alignment of optical components before the polygon mirror. When unit to unit variation exists, projection of the line segment onto a facet may vary and the way in which the polygon mirror reflects sections of the Gaussian profile onto the photosensitive member may also vary from a unit to unit perspective. As a result, spot power variation or power rolloff across the scan line may vary for different identical units even if they are characterized with the same set of characterization data, and print density darkness variation may become objectionable especially when the variation is relatively large.

SUMMARY

Example embodiments of the present disclosure provide a shading system for a laser scanning unit (LSU) that allows for the generation of a shade profile that can compensate for image darkness variation due to LSU power variability. In one example embodiment, a method of characterizing a laser scanning unit in an image forming device includes receiving a first set of characterization data from first memory of the image forming device, and receiving a second set of characterization data from second memory separate from the first memory and included in the laser scanning unit. Based at least on the first and second sets of characterization data, the method generates a shade profile indicating future power corrections of a laser beam emitted by a light source of the laser scanning unit when the laser scanning unit performs scanning operations across a plurality of scan lines to substantially reduce spot energy variation along each scan line towards zero.

In another example embodiment, a method of controlling a laser scanning unit in an image forming device includes receiving, by driver circuitry, a first signal containing image data for modulating a laser beam to form an image corresponding to the image data, and a second signal indicating shading information. The driver circuitry modulates the laser beam based on the first signal, wherein a laser power of the modulated laser beam is adjusted based on the shading information as the laser beam is scanned across a scan line to substantially reduce energy variation along the scan line.

In another example embodiment, a laser scanning unit for an image forming device includes a light source for emitting a laser beam, a scanning member having at least one reflective surface for scanning the laser beam onto an imaging surface across a plurality of scan lines, and driver circuitry for driving the light source to emit the laser beam. The driver circuitry has a first input for receiving a first signal indicating image information and a second input for receiving a second signal indicating shading information. The driver circuitry modulates the laser beam based on the first signal to form an image on the imaging surface corresponding to the image information and adjusts an output power of the modulated laser beam based on the second signal to substantially reduce energy variation across each scan line.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings, wherein.

DETAILED DESCRIPTION

Figure 1:
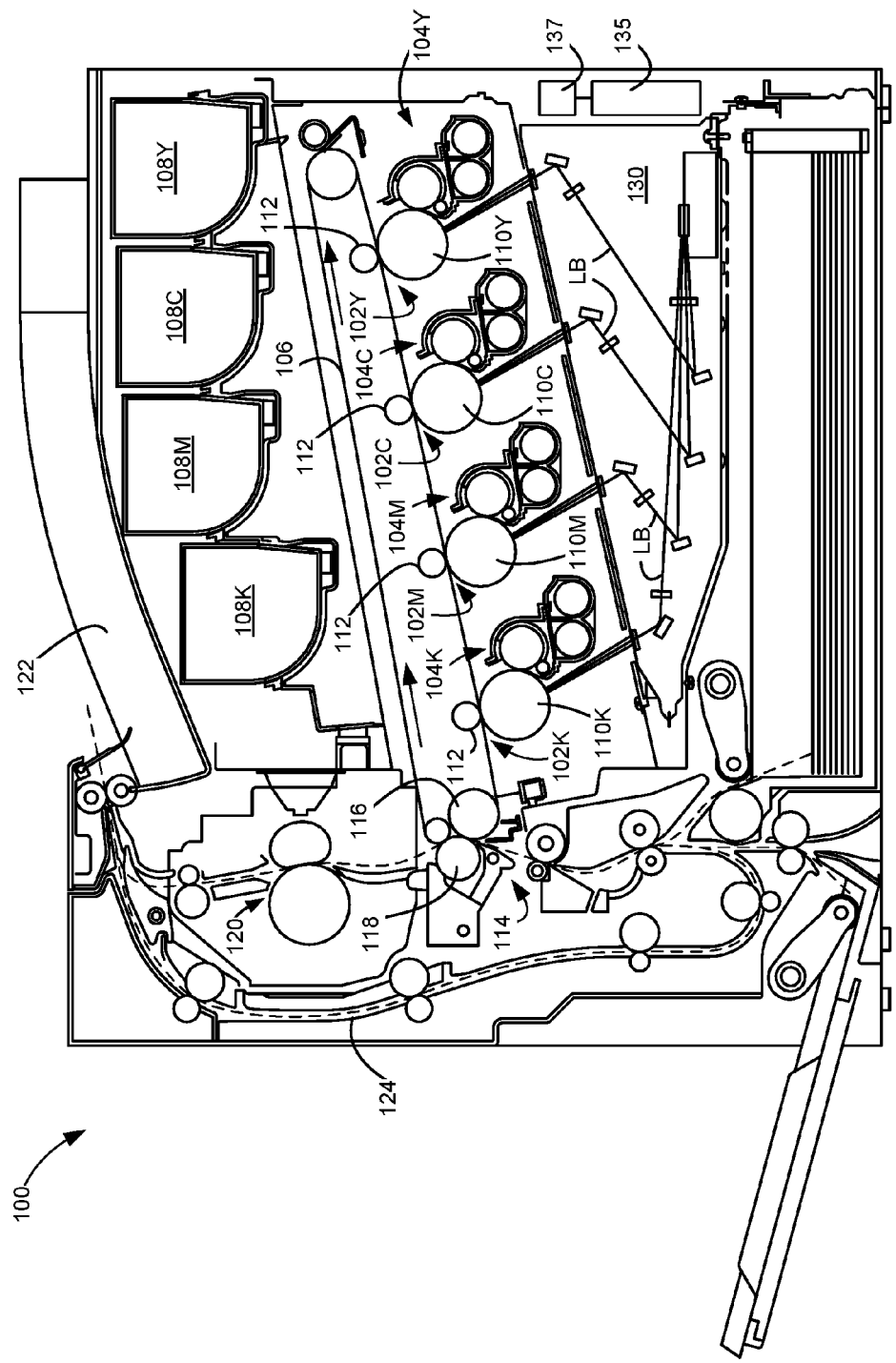
FIG. 1 is a side elevational view of an image forming device according to an example embodiment.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Spatially relative terms such as "top", "bottom", "front", "back" and "side", "above", "under", "below", "lower", "over", "upper", and the like, are used for ease of description to explain the positioning of one element relative to a second element. Terms such as "first", "second", and the like, are used to describe various elements, regions, sections, etc. and are not intended to be limiting. Further, the terms "a" and "an" herein do not denote a limitation of quantity, but rather denote the presence of at least one of the referenced item.

Furthermore, and as described in subsequent paragraphs, the specific configurations illustrated in the drawings are intended to exemplify embodiments of the disclosure and that other alternative configurations are possible.

Reference will now be made in detail to the example embodiments, as illustrated in the accompanying drawings. Whenever possible, the same reference numerals will be used throughout the drawings to refer to the same or like parts.

FIG. 1 illustrates a color image forming device 100 according to an example embodiment. Image forming device 100 includes a first toner transfer area 102 having four developer units 104 that substantially extend from one end of image forming device 100 to an opposed end thereof. Developer units 104 are disposed along an intermediate transfer member (ITM) 106. Each developer unit 104 holds a different color toner. The developer units 104 may be aligned in order relative to the direction of the ITM 106 indicated by the arrows in FIG. 1, with the yellow developer unit 104Y being the most upstream, followed by cyan developer unit 104C, magenta developer unit 104M, and black developer unit 104K being the most downstream along ITM 106.

Each developer unit 104 is operably connected to a toner reservoir 108 for receiving toner for use in a printing operation. Each toner reservoir 108 is controlled to supply toner as needed to its corresponding developer unit 104. Each developer unit 104 is associated with a photoconductive member 110 that receives toner therefrom during toner development to form a toned image thereon. Each photoconductive member 110 is paired with a transfer member 112 for use in transferring toner to ITM 106 at first transfer area 102.

During color image formation, the surface of each photoconductive member 110 is charged to a specified voltage, such as −800 volts, for example. At least one laser beam LB from a printhead or laser scanning unit (LSU) 130 is directed to the surface of each photoconductive member 110 and discharges those areas it contacts to form a latent image thereon. In one embodiment, areas on the photoconductive member 110 illuminated by the laser beam LB are discharged to approximately −100 volts. The developer unit 104 then transfers toner to photoconductive member 110 to form a toner image thereon. The toner is attracted to the areas of the surface of photoconductive member 110 that are discharged by the laser beam LB from LSU 130.

ITM 106 is disposed adjacent to each of developer unit 104. In this embodiment, ITM 106 is formed as an endless belt disposed about a drive roller and other rollers. During image forming operations, ITM 106 moves past photoconductive members 110 in a clockwise direction as viewed in FIG. 1. One or more of photoconductive members 110 applies its toner image in its respective color to ITM 106. For mono-color images, a toner image is applied from a single photoconductive member 110K. For multi-color images, toner images are applied from two or more photoconductive members 110. In one embodiment, a positive voltage field formed in part by transfer member 112 attracts the toner image from the associated photoconductive member 110 to the surface of moving ITM 106.

ITM 106 rotates and collects the one or more toner images from the one or more developer units 104 and then conveys the one or more toner images to a media sheet at a second transfer area 114. Second transfer area 114 includes a second transfer nip formed between at least one back-up roller 116 and a second transfer roller 118.

Fuser assembly 120 is disposed downstream of second transfer area 114 and receives media sheets with the unfused toner images superposed thereon. In general terms, fuser assembly 120 applies heat and pressure to the media sheets in order to fuse toner thereto. After leaving fuser assembly 120, a media sheet is either deposited into output media area 122 or enters duplex media path 124 for transport to second transfer area 114 for imaging on a second surface of the media sheet.

Image forming device 100 is illustrated in FIG. 1 and described above as a color imaging device in which toner is transferred from each developer unit 104 onto ITM 106 at first transfer area 102 in a first step, and from ITM 106 to a media sheet at second transfer area 114 in a second step. It is understood that image forming device 100 may be a color imaging device in which toner from each developer unit 104 is transferred to a sheet of media in one step—from photoconductive members 110 directly to a media sheet. It is further understood that image forming device 100 may be a monochrome imaging device having only one developer unit 104 for depositing black toner to a media sheet. The general architectures of color imaging devices transferring toner in one step and monochrome imaging devices are known and will not be discussed in further detail herein for reasons of simplicity. Further, image forming device 100 may be part of a multi-function product having, among other things, an image scanner for scanning printed sheets.

Image forming device 100 further includes a controller 135 and memory 137 communicatively coupled thereto. Controller 135 may include any number of controllers and/or processors, and other software, firmware and/or hardware logic necessary to suitably control the functions of imaging apparatus 20, and may be implemented as one or more application specific integrated circuits (ASICs). Memory 137 may be any volatile and/or non-volatile memory such as, for example, random access memory (RAM), read only memory (ROM), flash memory and/or non-volatile RAM (NVRAM). Alternatively, memory 137 may be in the form of a separate electronic memory (e.g., RAM, ROM, and/or NVRAM), a hard drive, a CD or DVD drive, or any memory device convenient for use with controller 22. Though not shown in FIG. 1, controller 135 may be coupled to components and modules in image forming device 100 for controlling same. For instance, controller 135 may be coupled to toner reservoirs 108, developer units 104, photoconductive members 110, fuser 120 and/or LSU 130 as well as to motors (not shown) for imparting motion thereto.

Figure 2:
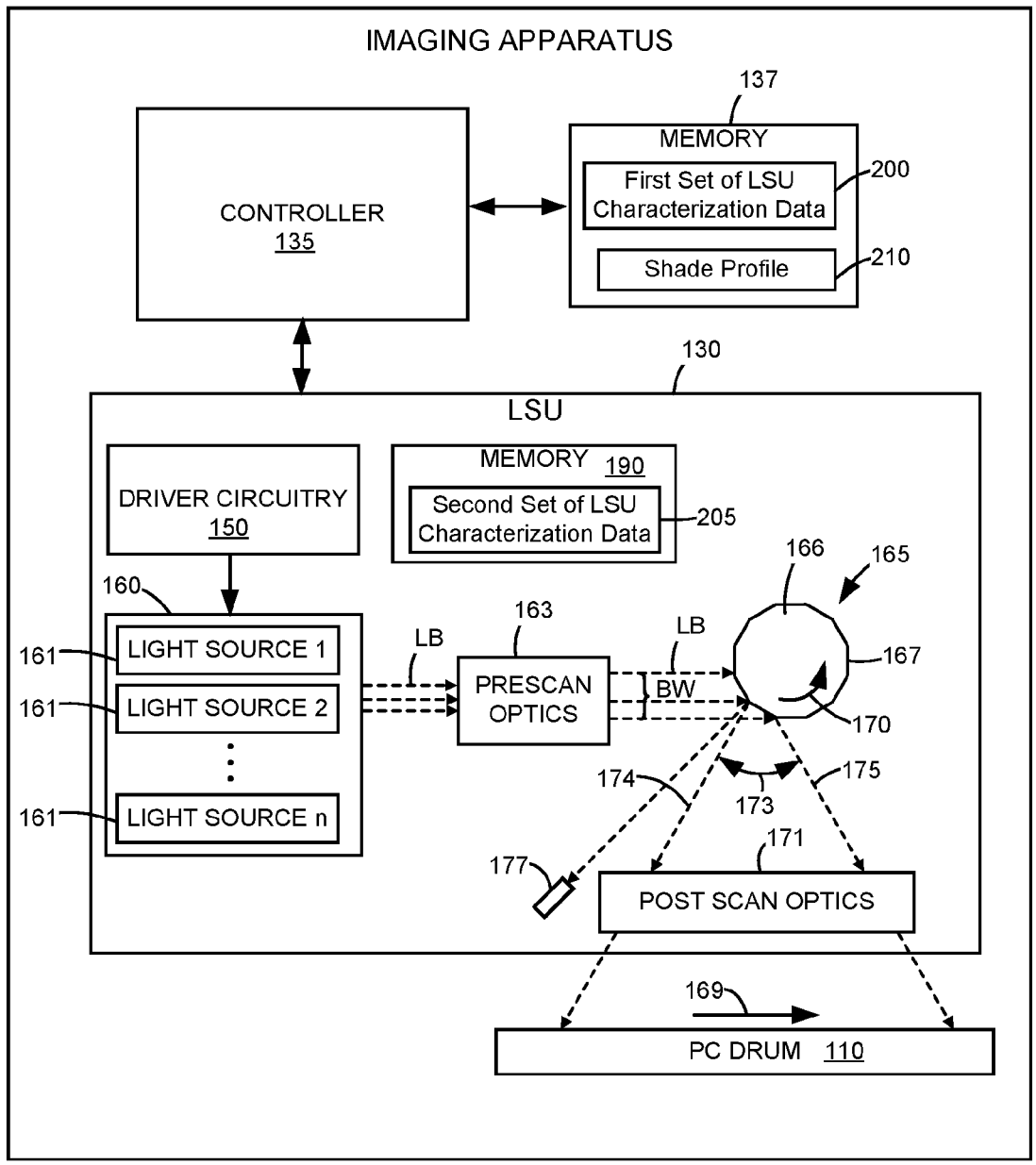
FIG. 2 is a schematic diagram illustrating a controller in communication with a laser scanning unit and memory of the imaging apparatus in FIG. 1 according to an example embodiment.

Referring now to FIG. 2, a schematic of at least a portion of LSU 130 in communication with controller 135 is shown. LSU 130 includes driver circuitry 150, a light assembly 160, pre-scan optics 163, a scanning device 165, post-scan optics 171, and memory 190. Driver circuitry 150 is communicatively coupled to controller 135 for receiving video/image information and/or control data that is utilized to set and/or vary the laser power used by each of light source 161 of light assembly 160. In one example embodiment, driver circuitry 150 may include a single laser driver that may be utilized to set the laser power used by all light sources 161. In another example embodiment, driver circuitry 150 may include multiple laser drivers that may each be utilized to set the laser power used by one or more light sources that are associated with the cyan, magenta, yellow and black (CMYK) image planes, or alternatively, a combination of light sources 161 associated with different color CMYK image planes. Light sources 161 may each be implemented, for example, using a laser diode or any other suitable light source.

Pre-scan optics 163 may include one or more collimating lenses, pre-scan lenses and/or other optical system components as the specific implementation requires to direct and focus each of the laser beams LB emitted by light sources 161 towards scanning device 165.

Scanning device 165 includes a polygon mirror 166 having a plurality of reflective surfaces or facets 167 for receiving and reflecting light incident thereon. In the example shown, polygon mirror 166 is a 12-facet polygon. Polygon mirror 166 is to controllable by controller 135 using a motor (not shown) to rotate at a rotational velocity during an imaging operation so as to unidirectionally scan at least portions of laser beams LB in a scan direction 169 to create scan lines on respective photoconductive members 110 in a process direction.

Post-scan optics 171 may include post-scan lenses and/or other optical system components used to direct each modulated beam LB to their corresponding photoconductive drums 110. Post-scan optical components may each be provided as part of the LSU 130 or such components may be otherwise mounted within the image forming device 100.

During an imaging operation, image data corresponding to an image to be printed is converted by controller 135 into laser modulation data. Controller 135 further initiates an operation whereby the laser modulation data associated with at least one light source 161 is communicated to driver circuitry 150. The laser modulation data is utilized by the driver circuitry 150 so that LSU 130 outputs modulated laser beam LB. Laser beam LB emitted from its corresponding light source 161 passes through pre-scan optics 163 and scanning device 165 directs portions of laser beam LB modulated with image data toward post-scan optics 171 and the surface of photoconductive drum 110 through a scan angle 173 defined by scan positions 174 and 175 to follow a scan path on photoconductive drum 110. During the imaging operation, photoconductive drum 110 advances or rotates in the process direction such that scan lines are created on photoconductive drum 110 with each scan line being separated from the previous scan line by the amount of rotation of photoconductive drum 110. Scanning device 165 may also cause the reflected laser beam LB to extend beyond scan angle 173, e.g. before scan position 174 relative to scan direction 169, to strike, directly or indirectly, a horizontal synchronization (hsync) sensor 177. The output of hsync sensor 177 is provided to controller 135 for referencing correct locations of each of the scan lines. For example, the output of hsync sensor 177 may be used to indicate at least a start of a scan line operation and provide a common reference point for each scan line.

According to one example embodiment, LSU 130 utilizes an over-filled polygon facet design. More particularly, each laser beam LB is expanded by pre-scan optics 163 so as to over-fill a facet 167 of polygon mirror 166 when performing a scan line operation. Thus, the width of the laser beams LB upon being incident on polygon mirror 166 is larger than the length of a facet 167 of polygon mirror 166. For example, each laser beam LB may have a beam width BW that is wide enough to be incident on polygon mirror 166 to completely fill or cover at least two facets 167 of polygon mirror 166. When polygon mirror 166 rotates in the counter-clockwise direction 170, and as a facet 167 exposed to laser beam LB rotates between a start and an end of a scan line operation, the beam width BW at polygon mirror 166 allows laser beam LB to cover an entire length of the facet from the start to the end of the scan line operation, thereby deflecting only a portion of incoming laser beam LB towards photoconductive member 110 during the entire scan line operation. Meanwhile, adjacent facet(s) or portions thereof exposed to laser beam LB at the same time may direct other portions of laser beam LB away from photoconductive member 110. After the scan line operation, a subsequent scan line operation may be immediately performed by a subsequent facet in the same manner as the preceding facet. Thus, portions of the laser beams LB are always on the facet and there is substantially no inactive scan time corresponding to the time it takes for laser beams LB to cross over an edge of a facet to a next facet for a subsequent scan line operation, thereby allowing for duty cycles (ratio of the active scan time on the photoconductive member to the total scan time of a facet) to be very close to 100%.

In accordance with example embodiments of the present disclosure, memory 137 is stored with a first set of LSU characterization data 200 associated with a family of LSUs to which LSU 130 belongs while memory 190 included in LSU 130 is stored with a second set of LSU characterization data 205 specific to LSU 130. The first set of LSU characterization data 200 may include parameters that characterize and/or are pertinent to LSUs of the same type or model. Thus, the same first set of LSU characterization data 200 is used for all LSUs of the same type or model and may be obtained empirically by performing tests and measurements on several LSUs of the same type or model. Meanwhile, the second set of LSU characterization data 205 may include LSU-specific parameters that are unique to a particular LSU. Thus, the second set of LSU characterization data for LSU 130 may differ from those of other LSUs belonging to the same type or model as LSU 130.

In one example embodiment, the second set of LSU characterization data 205 may be obtained during production of LSU 130. For example, during production, LSU 130 may be placed on a fixture that is used to collect spot power data at multiple locations along a beam scan path. In one example, the fixture may include a plurality of power detectors positioned at multiple locations along the beam scan path. The location of the power detectors on the fixture may correspond to a relative location of a photoconductive drum when LSU 130 is installed in image forming device 100. LSU 130 may then be powered on in such a way that the beam is scanned across the beam scan path allowing each power detector to collect power data at each detector location as the laser beam is swept across the beam scan path. In another example, the fixture may include at least one power detector that is movable along the beam scan path. As the LSU 130 scans the laser beam across the beam scan path, the power detector is moved along the beam scan path to sample and collect power data at multiple locations of the beam scan path. Collected power data is typically normalized and a vector representing the power data is stored in LSU memory 190. Other parameters may also be collected and/or derived based at least on the collected power data and/or obtained by performing other forms of tests and measurements, and then stored in LSU memory 190 as part of the second set of LSU characterization data 205. Accordingly, data obtained from performing individual tests and measurements on LSU 130 provide the second set of LSU characterization data 205 specific to LSU 130. The second set of LSU characterization data 205 may be stored in LSU memory 190 during production and/or before LSU 130 is installed in image forming device 100.

In operation, when LSU 130 is installed in image forming device 100, controller 135 is configured to retrieve the first and second sets of LSU characterization data 200, 205 from memory 137 and LSU memory 190, respectively, generate a shade profile 210 based on the first set of LSU characterization data 200 and the second set of LSU characterization data 205, and then store the shade profile 210 in memory 137. In general, the shade profile 210 is utilized by controller 135 to generate pulse width modulation (PWM) shade signals indicating shading information for use in correcting or compensating for energy variation along the beam scan path on the photoconductive drum 110, as will be described in greater detail below. In one example embodiment, controller 135 may update or adjust shade profile 210 based on control information associated with a print job request.

Figure 3:
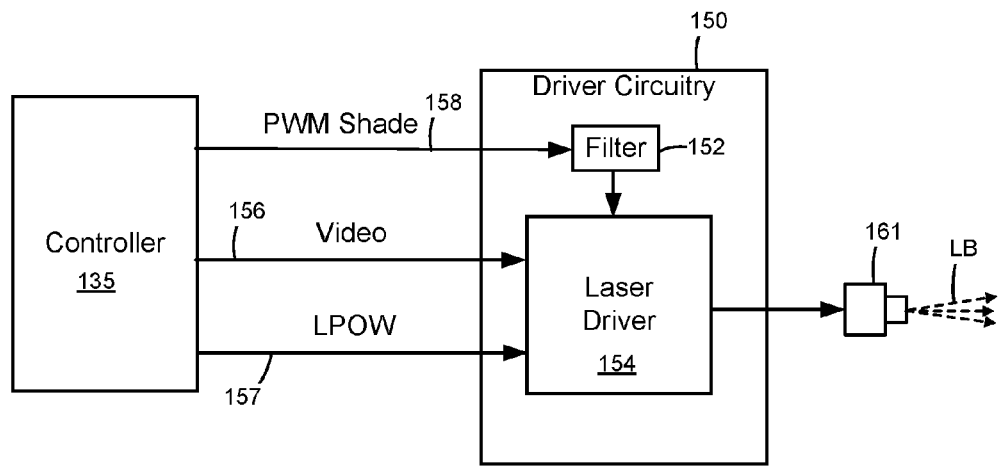
FIG. 3 is a schematic diagram illustrating the controller in communication with driver circuitry of the laser scanning unit according to an example embodiment.

FIG. 3 shows an example diagram illustrating driver circuitry 150 of LSU 130 in communication with controller 135. Driver circuitry 150 includes an analog circuit or filter 152 and a laser driver 154 that is connected to light source 161. Controller 135 generates a laser modulation signal or video signal based on image data and transmits the video signal containing the image data through a first channel 156 to an input of the laser driver 154 for modulating the laser beam LB emitted by light source 161. A laser power signal LPOW is provided by controller 135 to a reference power level input of laser driver 154 via second channel 157 to provide a laser power reference. Controller 135 also generates a PWM shade signal based on shade profile 210 and transmits the PWM shade signal through a third channel 158 to driver circuitry 150. Filter 152 receives and converts the PWM shade signal to an analog signal, which in turn is provided to laser driver 154 for use thereby in performing fine shifts in laser driver current to modify the laser power of the modulated laser beam LB emitted by light source 161. Accordingly, during a laser scanning operation, driver circuitry 150 receives both the video signal containing image data and the PWM shade signal. Driver circuitry 150 modulates the laser beam based on the video signal to form a latent image on the surface of photoconductive drum 110 and adjusts an output power of the modulated laser beam based on the PWM shade signal to correct and/or compensate for energy variation along each scan line.

Figure 4:
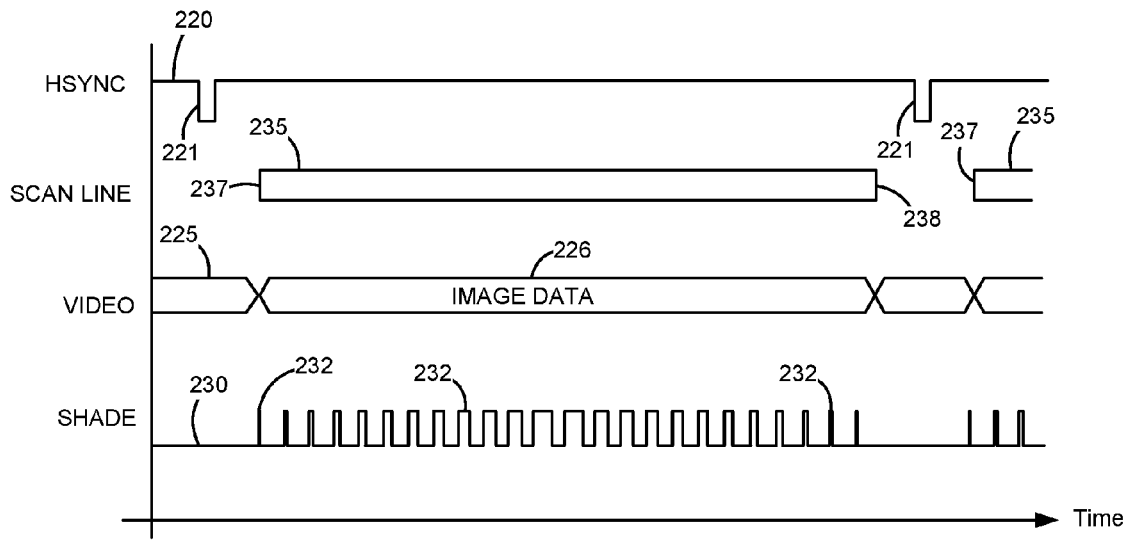
FIG. 4 is chart illustrating timing relationship between a scan line and signals within the laser scanning unit according to an example embodiment.

FIG. 4 shows an example diagram illustrating timing relationships between a hsync signal 220, video signal 225, shade signal 230, and a representative scan line 235. With respect to scan line 235, the horizontal dimension represents the physical position, or spot location, of laser beam LB on photoconductive drum 110 relative to time. In the example shown, hsync signal 220 has a hsync pulse 221 with a rising edge that coincides with the laser beam LB striking hsync sensor 177. A predetermined amount of time after hsync pulse 221, a scan line operation is initiated to write scan line 235. Video signal 225 includes an image data portion 226 provided after hsync pulse 221 and corresponding to the duration of scan line 235 in which image data is written on photoconductive drum 110 to form a latent image thereon. Image data portion 226 of video signal 226 contains image data for modulating laser beam LB from a start 237 of scan line 235 to an end 238 thereof. In the example embodiment illustrated, shade signal 230 includes a sequence of PWM shade pulses 232 after hsync pulse 221 during the same time period in which scan line 235 is formed. The sequence of PWM shade pulses 232 coincides with the duration of scan line 235 and, in the example shown, is provided approximately concurrently with the image data portion 226 of video signal 225. The PWM shade pulses 232 of shade signal 230 are generated based on the shade profile 210 and each PWM shade pulse 232 indicates the amount of shade applied to the modulated laser beam LB at a corresponding physical position or spot location of laser beam LB on photoconductive drum 110 so as to correct for energy variation and/or variability in image darkness across scan line 235. In one example embodiment, the sequence of PWM shade pulses 232 is relatively the same per scan line 235 but varies as a function of time from hsync signal 220.

An example shade system algorithm executed by controller 135 to generate shade profile 210 will now be described with reference to FIGS. 5-11. In general, the algorithm utilizes spot power levels and laser beam velocity at different scan locations of the beam scan path or scan line to determine energy distribution across the scan line, and generate values that are used for adjusting the spot power along the scan line to achieve substantially uniform energy distribution and/or reduce variability in image darkness across the scan line.

Figure 5:
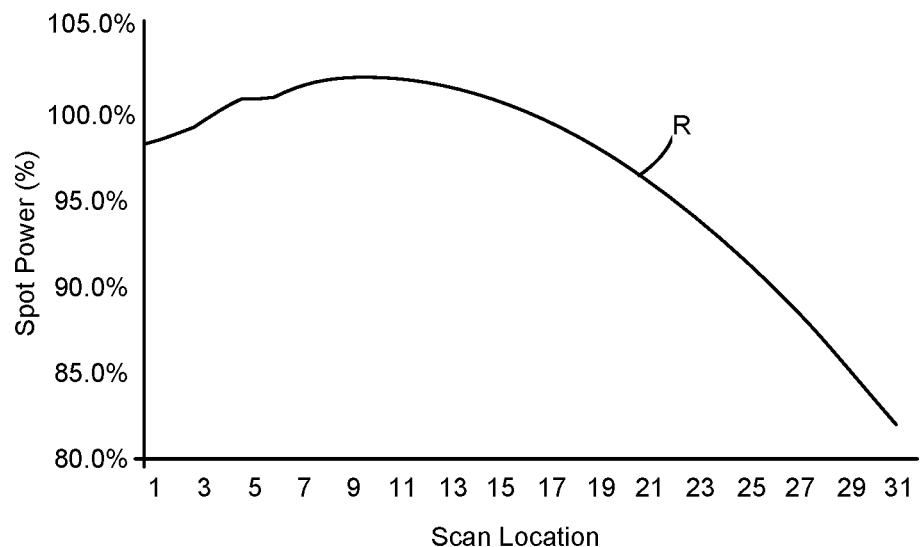
FIG. 5 illustrates a graph of showing a power rolloff curve according to an example embodiment.

FIG. 5 illustrates an example power rolloff curve R representative of power data obtained during LSU production, as described above, as a function of scan/spot location. Power rolloff curve R generally describes the relative static spot power, in terms of percentage, at multiple spot locations along the beam scan path. For purposes of illustration, the power rolloff curve R is defined by relative static spot power measured from thirty-two spot locations along the beam scan path. It will be appreciated, however, that static spot power may be measured from any suitable number of spot locations along the beam scan path. In this example, the relative static spot power values at the thirty-two spot locations are stored in LSU memory 190 as a vector R[n], with n=0 to 31 corresponding to the thirty-two spot locations, and form part of the second set of LSU characterization data 205.

Figure 6:
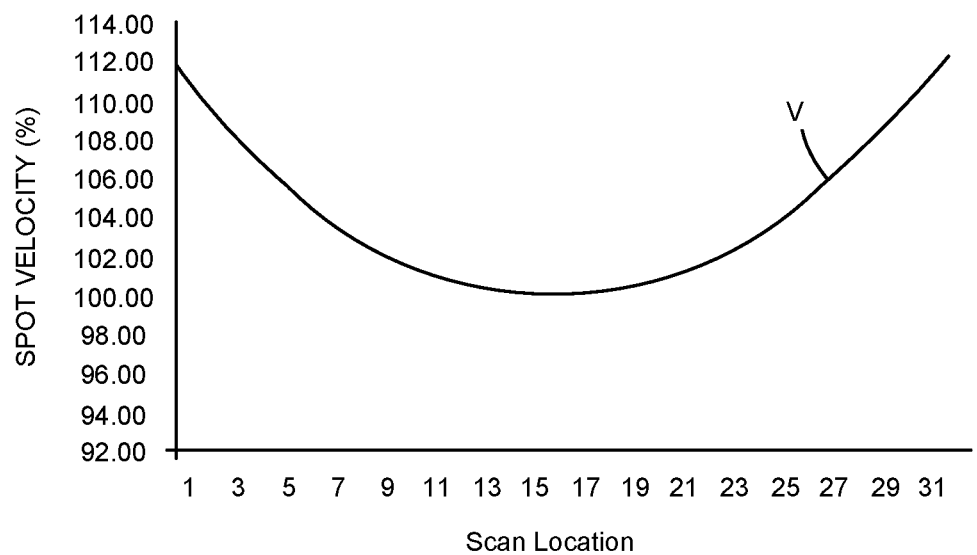
FIG. 6 illustrates a graph showing laser beam spot velocity across a scan line according to an example embodiment.

FIG. 6 illustrates an example curve V representative of normalized laser beam spot velocity, in terms of percentage, as a function of scan/spot location. As shown, spot velocity is slower at a center scan location of the scan line than at the edge scan locations thereof due to the scanning nature of LSU 130 such that, given a constant laser power, the laser beam can add a greater amount of energy at the center of the scan line than at the edges thereof. Spot velocity is relatively consistent from LSU to LSU of the same type or model. The laser beam velocities at the thirty-two scan locations corresponding to the thirty-two spot locations of vector R[n] are stored in memory 137 as a vector V[n] and form part of the first set of LSU characterization data 200.

In the examples shown in FIGS. 5-6, relative static spot power and spot velocity have been expressed in terms of percentage for purposes of illustration and thus should not be considered limiting. It will be appreciated that static spot power and spot velocity may be expressed or represented in other suitable forms as may be desired.

Figure 7:
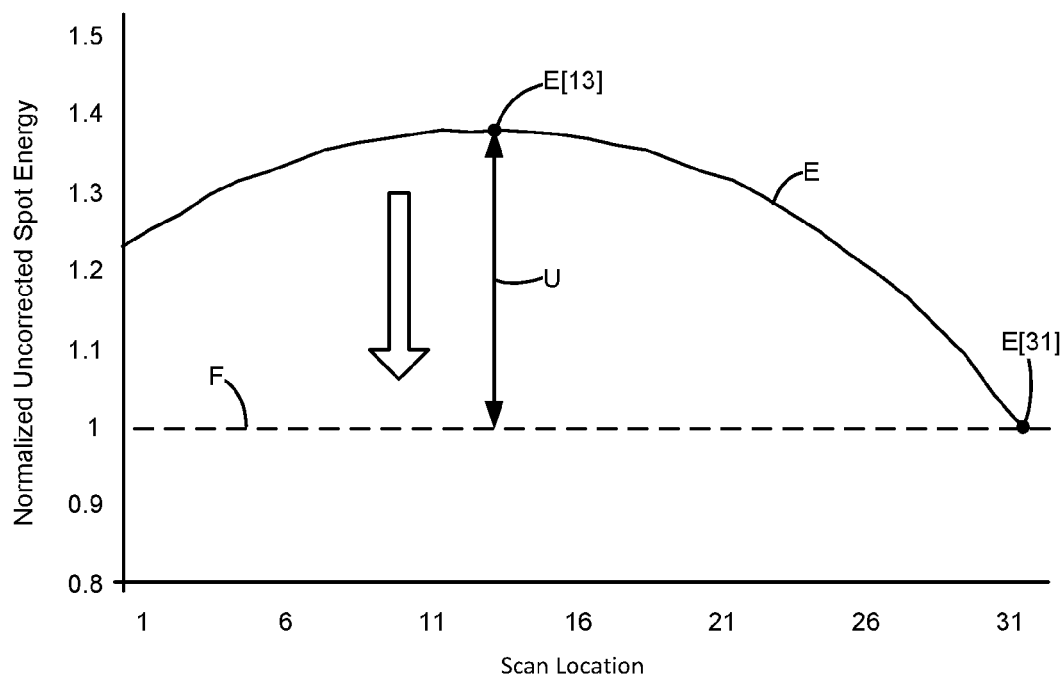
FIG. 7 illustrates a graph depicting an example curve of uncorrected spot energy and energy variation across a scan line.

Controller 135 may determine variation in energy across the scan line using the relative static spot power and relative spot velocity at each of the thirty-two spot locations. In particular, controller 135 utilizes a ratio of relative static spot power and relative spot velocity to determine the uncorrected relative energy delivered by the laser beam along the scan line at the thirty-two spot locations, such as by using the following equation:

$$E[n] = \frac{R[n]}{V[n]}$$

where E[n] is a vector of uncorrected relative spot energy in terms of percentage. The uncorrected relative spot energy E[n] may be normalized for subsequent use and processing, such as by using the following equation:

$$E[n] = \frac{E[n]}{\min(E[n])}$$

where min(E[n]) is the lowest uncorrected relative spot energy. By normalizing the uncorrected relative energy E[n] using the above equation, relative spot energy at the thirty-two spot locations are normalized into values greater than or equal to one, with the lowest uncorrected spot energy set to 1. FIG. 7 depicts an example curve E of the normalized uncorrected spot energy E[n] illustrating energy variation across the scan line. In the example shown, relative spot energy is highest (or maximum) at data point E[13]and is lowest (or minimum) at data point E[31].

In order to reduce the variability in energy across the scan line, the curve of uncorrected spot energy E is reduced to a substantially flattened energy level. In FIG. 7, a broken line F corresponds to the spot energy at data point E[31]having the lowest energy and, in this example illustration, represents the flattened energy level at which the curve of uncorrected spot energy E is to be substantially flattened. Generally, each point of the curve E has an associated uncorrected power value that the algorithm reduces to a flattened power value corresponding to the flattened energy level F. Controller 135 may calculate a value representing an amount of uncorrected power needed so that the maximum spot energy can be decreased or flattened to lowest energy. An uplift coefficient U corresponding to the difference between the maximum and minimum spot energy is determined using the following equation:

$$U = \max(E[n]) - \min(E[n])$$

where U is the uplift coefficient in terms of percentage, max(E[n]) is the highest relative spot energy, and min(E[n]) is the lowest relative spot energy. As shown, the uplift coefficient U indicates the relative difference between the curve of uncorrected spot energy E and the flattened energy level F at the scan location where the uncorrected spot energy is highest, i.e., at data point E[13].

Figure 8:
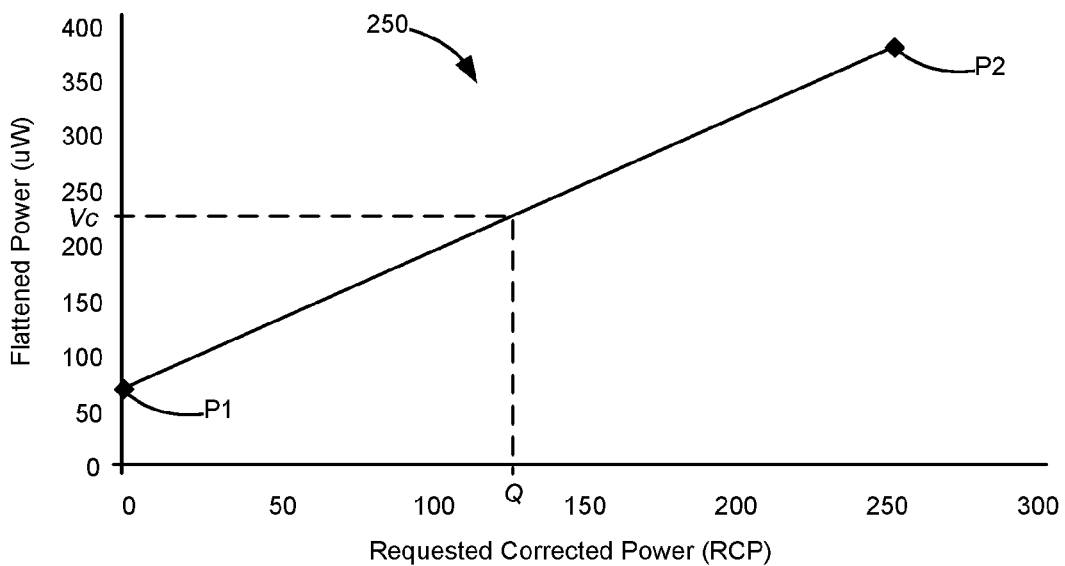
FIG. 8 illustrates a graph showing an example relationship between flattened power and requested corrected power.

Controller 135 may utilize the uplift coefficient U to determine an amount of to uncorrected power needed so that the maximum energy can be decreased or flattened to the lowest energy. This amount of uncorrected power may be determined using the following equation:

$$Vu = (1+U) \times Vc$$

where Vu is the uncorrected power in μW and Vc is a flattened or corrected power value in μW. In one example embodiment, the flattened power value Vc may be determined based on a value associated with control information, such as a requested corrected power (RCP) or requested flattened power (RFP) corresponding to a user-requested darkness for images to be printed, and using empirically derived data. For example, FIG. 8 illustrates a graph 250 showing an empirically determined relationship between flattened power and RCP. Graph 250 generally provides information on the output power performance of LSU 130 for different darkness levels. In one example, graph 250 may be defined by at least two points P1, P2 which are set as defined values in memory 137 associated with controller 135 and form part of the first set of LSU characterization data 200. RCP is a value between 0 and 255 and is used to select a flattened power. For example, given a requested darkness corresponding to an RCP value of Q, controller 135 determines a corresponding flattened power value Vc using at least the stored points P1, P2 defining graph 250.

Figure 9:
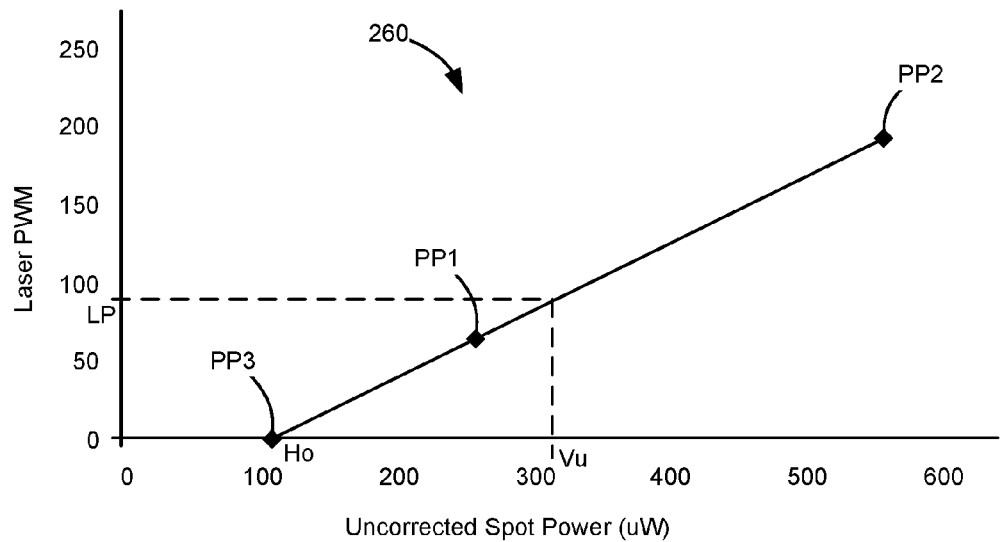
FIG. 9 illustrates a graph describing an example relationship between spot power in µW and laser PWM.

The uncorrected power value Vu may be used to determine a corresponding physical laser PWM that produces the uncorrected spot power Vu. FIG. 9 illustrates a graph 260 describing an example relationship between spot power in μW and laser PWM. Graph 260 may be defined by points PP1, PP2 which are stored in LSU memory 190 and form part of the second set of LSU characterization data 205. Further, graph 260 is shown intersecting the x-axis at point PP3 which describes the uncorrected power output Ho when the laser PWM is set to zero. Given the uncorrected power output Vu, a corresponding laser PWM value LP may be determined using points PP1, PP2 describing graph 260.

Once the flattened power Vc is determined, the relative spot energy at each point of curve E is converted into shade power. Shade power corresponds to an amount of power to be subtracted from the uncorrected spot power at each spot location that would allow for the flattened energy level F to be achieved. In one example embodiment, the algorithm may utilize the relative difference between the curve of uncorrected spot energy E and the flattened energy level F at each spot location to determine the shade power to be applied across the scan line. The shade power can be expressed as set forth in the following equation:

$$Sp[n]=(E[n]-1) \times Vc$$

where Sp[n] is a vector of shade power in μW.

Figure 10:
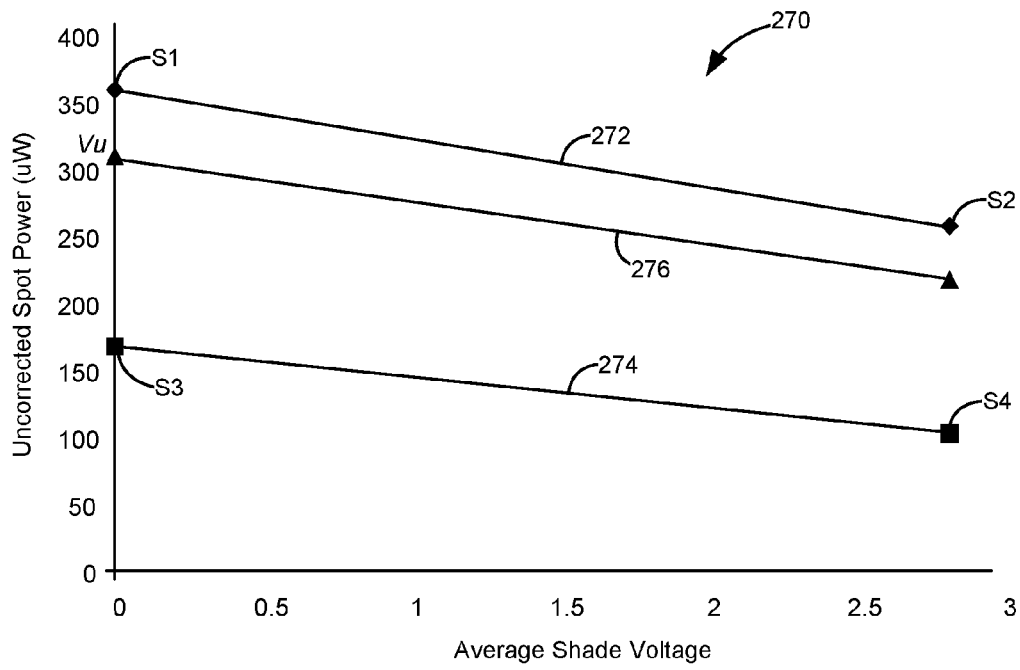
FIG. 10 illustrates a graph showing example relationships between average shade voltage and change in spot power for different uncorrected power values.

The shade power Sp[n] is converted to ticks using shade characterization data associated with LSU 130. In one example embodiment, the shade characterization data is stored in LSU memory 190 and forms part of the second set of LSU characterization data 205. Shade profile in ticks may be calculated using the following equation:

$$ST[n] = \frac{Sp[n]}{Sm} \times \frac{1}{G}$$

where ST[n] is a vector of the shade profile in ticks, Sm is a slope representing the amount of power change based on shade voltage (in μW/volt), and G is a scaling factor in volts/tick of the shade circuit that converts voltage to controller/processor ticks. Slope Sm is obtained based on the uncorrected power Vu and the shade characterization data stored in LSU memory 190. In FIG. 10, a graph 270 illustrates two linear functions 272, 274 each illustrating an example relationship between average shade voltage and uncorrected spot power for different uncorrected power values. Generally, each of the linear functions 272, 274 describes a corresponding change in uncorrected power based on the applied average shade voltage. Linear functions 272, 274 are defined by two characterization data point pairs (S1, S2) and (S3, S4), respectively, which are stored in LSU memory 190 and form part of the second set of LSU characterization data 205. Linear function 272 defined by data point pair (S1, S2) represents a first shade gain describing the amount of change in uncorrected power relative to a change in shade voltage from a given first uncorrected power defined by data point S1. Linear function 274 defined by data point pair (S3, S4) represents a second shade gain describing the amount of change in uncorrected power relative to a change in shade voltage from a given second uncorrected power defined by data point S3. For each of the first and second shade gains defined by linear functions 272, 274, respectively, the uncorrected power at data points S1, S3 decreases as the average shade voltage increases at a rate defined by the respective slopes of linear functions 272, 274.

Figure 11:
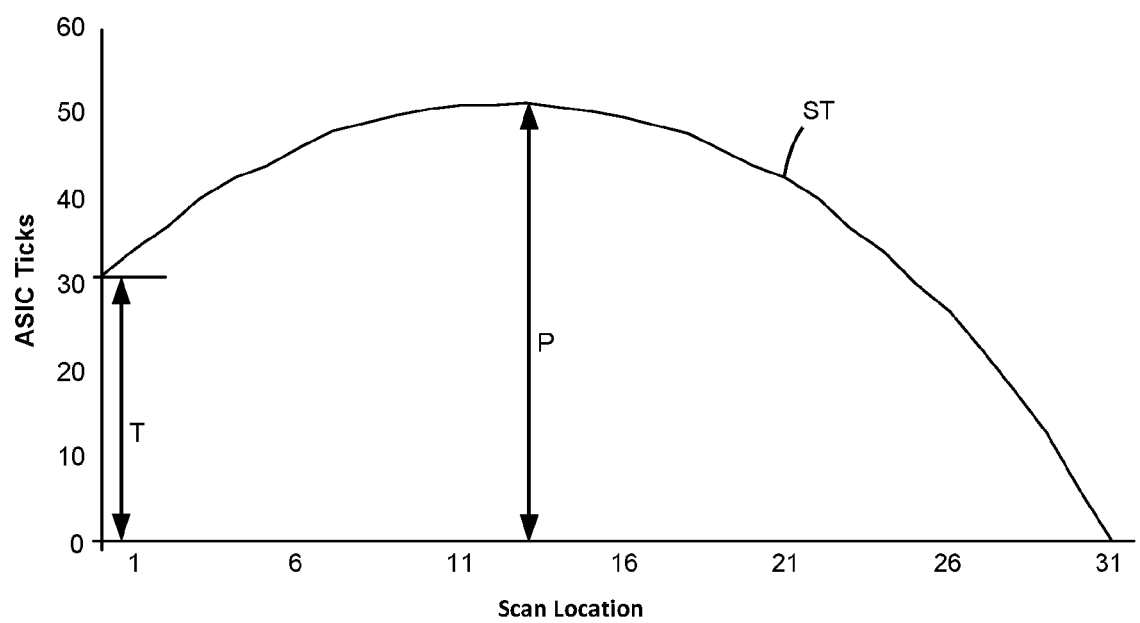
FIG. 11 illustrates a graph showing an example curve of shade profile in ticks.

In one example embodiment, the controller determines slope Sm based on interpolation and/or extrapolation of the slopes of linear functions 272, 274 and the uncorrected power value Vu. In particular, a correction curve 276 is formed between linear functions 272, 274 with the uncorrected power Vu set as a point on the correction curve 276 at a location corresponding to a zero shade voltage (i.e., the correction curve 276 is made to intersect the y-axis at a point corresponding to the uncorrected power Vu). In one example, the uncorrected power Vu is set as the y-intercept for the correction curve 276 if the uncorrected power Vu is greater than or equal to the spot power Ho that LSU 130 can output with the laser PWM set to zero, i.e., the laser PWM value LP that produces the uncorrected power output Vu is greater than or equal to zero (See FIG. 9). Otherwise, in the case where the uncorrected power Vu is less than the spot power Ho (i.e., the laser PWM that is determined to produce the uncorrected power output Vu is less than zero), the correction curve 276 may be made to intersect the y-axis at a point corresponding to the spot power Ho. The slope of correction curve 276 corresponds to the slope Sm which describes the change in the uncorrected power Vu relative to a change in shade voltage. FIG. 11 shows an example curve ST of the shade profile ST[n].

As discussed above with respect to FIG. 3, filter 152 receives and converts the PWM shade signal to an analog signal which is used in performing fine shifts in laser driver current. In one example, filter 152 may be used for different scan speeds and print window times which correspond to the amount of time the laser beam spends in the writeable area of photoconductive drum 110. The analog response of filter 152, in some instances depending on circuit performance, may vary depending on the scan speed and/or print window time. In one example embodiment, controller 135 may adjust the shade profile ST[n] in order to compensate for changes or any inadequacies in the analog response of filter 152, such as when the filter response is not fast enough to follow quick changes in the PWM signal (e.g., when print window times are relatively very short). Two parameters may be extracted from the shade profile ST[n]. These two parameters are illustrated in FIG. 11 as twist T and peak P. Twist T corresponds to the amount of offset between the ends of curve ST and peak P corresponds to the peak value of curve ST. Controller 135 may further determine the print window size FT (in microseconds) which is generally a function of the scan speed, the number of facets of polygon mirror 166, and scan efficiency. The scan speed may be based on the operating point or print mode while the facets and scan efficiency are based on the optical design of LSU 130 and are constants.

Controller 135 may create two new correction vectors COR0[n] and COR1[n] based on the three parameters T, P, and FT as set forth in the following equations:

Impulse=$K0/FT=K1 \times P+K2 \times T+K3$;

Start=$R0/FT+R1 \times P+R2 \times T+R3$;

Stop=$V0/FT+V1 \times V+R2 \times T+V3$;

Cor0[0]=Impulse; Cor[1–31]=0;

Cor1[0]=Start; Cor1[31]=Stop; Cor1[$n$]=Start–$n$×(Start–Stop)/31 where K0, K1, K2, K3, R0, R1, R2, R3, V0, V1, V2, and V3 are constants that are determined empirically based on circuit component values of LSU 130 and using optimization software. In general, the vectors COR0 and COR1 are used to shape the output of filter 152 to account for changes in analog response. The constants are relatively consistent from LSU to LSU of the same type or model and, thus, are stored in memory 137 associated with controller 135 to form part of the first set of LSU characterization data 200. Correction vectors COR0 and COR1 may be activated or deactivated, as needed, depending on the analog response of filter 152. In one example, correction vectors COR0 and COR1 may be deactivated by setting the constants and/or values thereof to zero. Additionally, in the case where the uncorrected power Vu is less than the power Ho that LSU 130 can output with the laser PWM set to zero, a shade offset value may be added to the correction vectors. The shade offset value may be expressed using the following equation:

$$SO = \frac{(Ho - Vu)}{Sm} \times \frac{1}{G}, \text{ if } PWM < 0$$

where SO is the shade offset in ticks.

In one example embodiment, controller 135 combines the shade profile in ticks ST[n], correction vectors COR0[n] and COR1[n], and shade offset SO to create a final vector G[n] such as by using the following equation:

G[$n$]=ST[$n$]+COR0[$n$]+COR1[$n$]+SO where vector G[n] represents the shade profile 210 that is loaded in memory 137. Vector G[n] may be converted into discrete values and sanitized to eliminate overflows and underflows. Thereafter, vector G[n] is loaded into registers of memory 137 as the shade profile 210. The entries of vector G[n] indicate varying pulse width values that are used to set the duty cycles of the pulses of the PWM shade signal at corresponding spot locations of laser beam LB. In operation, controller 135 steps through each value of vector G[n] as the laser beam moves across the scan line and sets the duty cycle of the PWM shade signal as a function of spot location. Accordingly, the PWM shade signal controls the output of laser driver 154 by causing laser driver current to change as a function of spot location based on the shade profile as the beam moves across photoconductive drum 110 to substantially reduce towards zero the energy variation across each scan line and/or reduce, if not eliminate, variability in image darkness along each scan line.

With the above example embodiments, a distinct set of characterization data stored in LSU memory 190 allows for the generation of a shade profile that can compensate for image darkness variation due to LSU power variability, thereby improving robustness of LSU 130. Further, application of the present disclosure also provides the provision to adjust image darkness across the scan line to compensate for factors other than LSU power variability. For example, photoconductive drum coating thicknesses may account for image darkness variations. By modifying the characterization data stored in the LSU memory, corrections for other issues in the electrophotographic system can be achieved. As such, applications of the present disclosure may go beyond scanning systems employing polygon mirrors with over-filled facet designs and may be applied to other scanning systems, such as oscillator-type scanning systems or those employing polygon mirrors with under-filled facet designs.

The foregoing description of several methods and embodiments of the present disclosure have been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

The invention claimed is:

1. An image forming device, comprising:
a controller;
a laser scanning unit in communication with the controller for generating a laser beam for discharging a photoconductive member to create a latent electrostatic image, the laser beam having a power characterized during production of the laser scanning unit and the laser scanning unit belonging to a family of laser scanning units of a same type;
a first memory on the laser scanning unit storing the power of the laser scanning unit having been said characterized during production; and
a second memory in communication with the controller separate from the first memory, the second memory storing characterization data for the family of laser scanning units of the same type.

2. The image forming device of claim 1, wherein the controller is configured to read the first and second memories and generate future power corrections of the laser beam.

3. The image forming device of claim 1, wherein the controller is configured to modulate the laser beam and to read the first and second memories to generate a sequence of pulse width modulation pulses to be applied to the laser beam during creation of the electrostatic latent image.

4. The image forming device of claim 1, wherein the controller is configured to read the first and second memories and generate a shade profile for the laser beam.

5. The image forming device of claim 4, wherein the laser scanning unit further includes driver circuitry in communication with the controller including an analog filter and a laser driver connected to a light source for creating the laser beam.

6. The image forming device of claim 5, wherein the controller is configured to provide the shade profile to the analog filter and provide image data and a laser power reference signal direct to the laser driver.

7. The image forming device of claim 5, wherein the analog filter connects to the laser driver and is configured to convert the shade profile from the controller into an analog signal for the laser driver to adjust an output power of the laser beam.

8. The image forming device of claim 4, wherein the controller if further configured to generate the shade profile based on control information associated with a print job request.

9. The imaging device of claim 1, the laser scanning unit further including a light source for emitting the laser beam and a scanning member having at least one reflective surface for scanning the laser beam onto the photoconductive member.

10. An image forming device, comprising:
a controller;
a laser scanning unit in communication with the controller for generating a laser beam for discharging a photoconductive member to create a latent electrostatic image, wherein the laser scanning unit belongs to a family of laser scanning units of a same type;
a first memory on the laser scanning unit storing data specific to the laser scanning unit having been characterized during production; and
a second memory in communication with the controller separate from the first memory, the second memory storing characterization data for the family of laser scanning units of the same type, wherein the controller is configured to read both the first and second memories to generate data to compensate for energy variations along a scan path of the laser beam on the photoconductive member during use.

\* \* \* \* \*